United States Patent [19]

Rumsey

[11] Patent Number: 5,836,233

[45] Date of Patent: Nov. 17, 1998

[54] SPRING BRAKE WITH SEALABLE BREATHER HOLES

[76] Inventor: Donald Rumsey, 400 3rd. Road North, Nampa, Id. 83687

[21] Appl. No.: 813,351

[22] Filed: Mar. 7, 1997

[51] Int. Cl.[6] ............................... F16D 65/24; F01B 7/00
[52] U.S. Cl. ................................. 92/63; 188/170
[58] Field of Search ................. 188/170; 92/63, 92/130 A

[56] References Cited

U.S. PATENT DOCUMENTS

| | | | |
|---|---|---|---|
| 3,479,927 | 11/1969 | Woodward | 92/130 A |
| 3,625,117 | 12/1971 | Tazelaar | 92/63 |
| 3,630,093 | 12/1971 | Mouse | 188/170 |
| 3,977,308 | 8/1976 | Swander, Jr. et al. | 92/63 |
| 5,215,170 | 6/1993 | Rapa | 188/170 |
| 5,623,862 | 4/1997 | Hanaway et al. | 92/63 |
| 5,664,478 | 9/1997 | Pierce | 92/63 |

*Primary Examiner*—Robert J. Oberleitner
*Assistant Examiner*—Chris Schwartz
*Attorney, Agent, or Firm*—Charles H. Thomas

[57] ABSTRACT

A pneumatic spring brake for an automotive vehicle has a housing formed of a spring chamber head and an adapter head, and has a spring brake diaphragm, a power spring, and a spring plate. The spring chamber head is a generally bowl-shaped structure having an end wall and a surrounding, generally frustoconical side wall. The surrounding side wall of the spring chamber head is formed with a plurality of vent or breather openings therein. According to the improvement of the invention, the spring brake diaphragm is configured so as to cover and seal all of the breather openings when the power spring is compressed in its caged position. Preferably, a guide mechanism is employed to ensure that the power spring remains in coaxial alignment with the service brake push rod, and to prevent any misalignment of the spring brake diaphragm from occurring within the confines of the spring chamber head and adapter head. Preferably also, the spring chamber head is provided with a caging tool access opening to allow the power spring to be mechanically caged prior to sealing or unsealing the mating rims of the adapter head and the spring chamber head. A simple check valve, in the form of a rubber stopper with one-way air passages defined therein, is located in the caging tool access opening in the spring chamber head.

17 Claims, 4 Drawing Sheets

SPRING BRAKE WITH SEALABLE BREATHER HOLES

BACKGROUND OF THE INVENTION

1. Field of the Invention

The present invention relates to an improved pneumatically controlled spring brake of the type usually utilized in heavy duty vehicles, such as commercial truck tractors and trailers.

2. Description of the Prior Art

Pneumatic spring brakes are widely utilized in the trucking industry. A typical conventional pneumatic spring brake has both a service brake portion for slowing and stopping a truck or trailer moving under normal conditions, and an emergency or parking brake portion. The service brake portion is operated by means of a foot valve located in the vehicle cab. The service brake portion of the pneumatic spring brake applies the brakes to the wheels of a truck or trailer on the highway using pneumatic pressure to act against a diaphragm located within the service brake housing. Air under pressure is utilized to activate the service brake portion.

In a typical pneumatic spring brake air is maintained in a pneumatic reservoir or tank carried on board the vehicle at a pressure on the order of about 100 psi. The reservoir provides 3,000 pounds of thrust against the 30 square inch effective surface area of the service brake diaphragm. Pneumatic pressure is maintained by an on board air compressor. If a failure develops in the pneumatic air supply system, however, the service brake will not function. In this event the emergency brake will thereupon operate automatically.

In a double diaphragm spring brake the emergency brake, which also serves as the parking brake, is mounted in tandem with the service brake. The actuation force of the emergency brake is applied to the brake mechanism on the vehicle wheel through the service brake push rod. Application of the emergency brake is entirely mechanical. The actuating force for the emergency brake is supplied by a heavy coil power spring located in a spring chamber of the pneumatic spring brake. This heavy power spring is normally maintained in check by air pressure acting on the opposite side of the spring brake diaphragm in the brake housing while the vehicle is in operation.

The power spring within the spring brake portion of the device applies the brake on a wheel to which it is connected when there is a loss of air pressure to the spring chamber of the emergency brake. Such a loss of pressure can occur either through a break or failure in the air line that applies pressure to the spring brake chamber, or by intentional exhaustion of air from the spring brake pressure chamber, as when the truck or trailer is parked. In this situation the spring brake serves as a parking brake.

The spring brake portion of a conventional, double diaphragm, automotive vehicle spring brake is formed of a housing that includes a hollow, generally bowl-shaped spring chamber head and a hollow adapter head. The adapter head forms part of the housing for both the spring brake and the service brake. The spring chamber head is formed with a transverse, generally circular-shaped end wall and a surrounding, generally frustoconical-shaped side wall that projects longitudinally from the transverse end wall and terminates at a generally circular spring chamber head rim. Similarly, the adapter head has a corresponding surrounding, frustoconical-shaped wall that projects toward the spring chamber head and likewise terminates in a generally circular rim. The rims of the spring chamber head and the adapter head are securely attached together throughout. Attachment may be accomplished in various ways. A preferred system for securing the rims of the spring chamber head and the adapter head together is described in U.S. Pat. No. 5,560,280.

The spring brake is provided with a spring brake diaphragm, which is formed as a molded, resilient, generally disk-shaped structure that extends transversely across the enclosure formed between the spring chamber head and the adapter head. The peripheral edge of the spring brake diaphragm is entrapped and sealed throughout between the mating rims of the spring chamber head and the adapter head. The spring brake diaphragm thereby divides the enclosure between the spring brake head and the adapter head into two portions. Specifically, a spring chamber is formed between the spring chamber head and the diaphragm, while a pressure chamber is formed between the adapter head and the diaphragm. The spring brake diaphragm serves as a flexible wall separating the spring chamber from the pressure chamber with a pressure-tight seal therebetween.

A power spring, typically a strong, heavy, coil spring, is located within the spring chamber and is longitudinally aligned along the axis of the brake push rod and is compressed to bear against the inside surface of the transverse end wall of the spring chamber head and the spring diaphragm. The power spring is quite heavy and typically weighs three pounds or more. The power spring is compressed to a linear length of less than three inches from an original, uncompressed length in an extended condition of from nine to twelve inches. The power spring is compressed between the spring diaphragm and the transverse end wall of the spring chamber head. A metal spring plate that has an outer diameter somewhat smaller than that of the spring brake diaphragm is normally interposed between the power spring and the spring brake diaphragm.

The spring brake is applied when pressure within the spring brake pressure chamber is vented, either by a break in a pneumatic line or component or by purposefully opening a vent valve. When pressure in the spring brake pressure chamber is exhausted, the power spring is held in a compressed condition in which it exerts a force on the housing of from seven hundred fifty pounds to one thousand seven hundred fifty pounds. In this condition the power spring serves to apply a braking force to the wheel of the vehicle. This braking force is applied in the event of a pressure failure within the pneumatic pressure system for the vehicle, with the result that the vehicle is brought to a controlled stop if such a pressure failure occurs while the vehicle is in motion. Alternatively, the spring brake serves as an emergency brake when the vehicle is parked, at which time pressure in the pressure chamber is purposefully exhausted.

The spring brake diaphragm is responsive to elevated pressure in the pressure chamber to further compress the power spring, thus removing any braking force from the power spring when the vehicle is in motion during normal operation. Pressure in the spring brake pressure chamber thereby holds the spring brake in a released or caged position.

In conventional spring brakes a plurality of vent openings are provided in the side wall of the spring chamber head so as to allow the interior of the spring chamber to remain at atmospheric pressure. These openings are also called bleeder or breather hole openings. These openings prevent the creation of a back pressure or vacuum in the spring chamber that could otherwise interfere with the proper operation of the spring brake. Also, the bleeder or breather openings serve as a means for draining any moisture from the spring chamber that might otherwise collect due to the condensation of moisture from the air within the spring chamber or which might be introduced through the caging tool access opening that is normally provided at the center of the transverse end wall of the spring chamber head.

While the vent or bleeder openings in the side wall of the spring chamber head are important to provide for pressure equalization inside and outside of the spring chamber, and to drain condensation and other moisture from the spring chamber, they do create certain problems. Specifically, as a vehicle travels, a certain amount of dirt, debris, and moisture does enter to the spring chamber through the vent openings in the side wall of the spring chamber head. The propensity for accumulation of such matter is aggravated by the heavy-duty road use of many of the vehicles upon which these types of brakes are installed, and the rugged, off-road use which many other vehicles utilizing such brakes experience. Conventional, double diaphragm, spring brakes are constructed without may means of excluding entry or any unwanted matter through the vent, breather, or bleed openings provided in the spring chamber head side wall.

SUMMARY OF THE INVENTION

According to the present invention a system is provided which allows the vent or bleed openings in the side wall in the spring chamber head to perform their drainage and pressure relief functions during operation of the spring brake, but which seals these openings when the power spring is retracted toward the transverse end wall of the spring chamber head. Moreover, the vent or bleeder hole sealing system of the invention is not at all complex. Quite to the contrary, the function of sealing these openings is achieved by constructing the spring brake diaphragm in such a manner that the flexible, resilient material of which it is formed is brought in to a position covering the vent or bleeder openings when the power spring is in its retracted or caged position. As a consequence, these openings are totally blocked during the time of greatest exposure of the spring chamber head to foreign objects, dirt, water, or other contaminating materials thrown up from the road.

In one broad aspect the present invention may be considered to be an improvement in a pneumatic automatic vehicle spring brake in which a spring chamber head and an adapter head are joined together to form a hollow enclosure therebetween. The spring chamber head is comprised of a transverse end wall remote from the adapter head and a surrounding side wall that extends from the transverse end wall to the adapter head. The side wall has at least one vent opening therethrough. The spring brake head and the adapter head clamp the periphery of a spring brake diaphragm therebetween so that the diaphragm divides the hollow enclosure into a spring chamber and a pressure chamber. A power spring is compressed within the spring chamber so as to bear against the transverse end wall and the diaphragm.

According to the improvement of the invention, the diaphragm is deflectable by pressure applied within the pressure chamber so as to further compress the power spring and to concurrently contact the surrounding side wall of the spring chamber head to thereby seal all of the vent openings therethrough. The structure of the diaphragm, which is formed of a resilient, water-tight, flexible material, contacts the interior surface of the spring chamber head throughout the inner circumference of the side wall thereof to form a moisture-tight and contaminant-tight seal at the vent or bleeder openings only when the power spring is forced into its caged position.

Unsealing of the bleed or vent openings by the application of the emergency or parking brake is unlikely to draw liquid or contaminants into the spring chamber, since the application of the emergency or parking brake normally occurs only when the vehicle has been stopped at some destination. On the other hand, while the vehicle is moving and the spring chamber head is subjected to a great deal of exposure to moisture and contamination, the spring brake diaphragm maintains a seal across the bleeder holes or vent openings.

As in conventional, double diaphragm, automotive vehicle brakes, the spring brake of the present invention includes a transverse spring plate located within the spring chamber and interposed between the diaphragm and the power spring. Also, as in conventional spring brakes of this type, the spring chamber head and adapter head define mating rims that are disposed in longitudinal alignment and in face-to-face relationship and which compress the periphery of the spring brake diaphragm therebetween. The spring chamber head has a transverse end wall and a surrounding frustoconical side wall extending from the transverse end wall to the adapter head. The power spring is compressed between the transverse end of the spring chamber head and the spring brake diaphragm, which is gripped about its periphery between the engaged rims of the spring chamber head and the adapter head. The spring plate is interposed between the spring brake diaphragm and the power spring. The power spring urges the spring plate and the diaphragm toward the adapter head. The power spring is compressible into a caged position within the spring chamber head by pneumatic pressure applied within the adapter head against the spring diaphragm on the side thereof opposite the spring plate.

The system of the invention is further improved by providing a guidance system that ensures that the spring plate is centered relative to the center of the transverse end wall of the spring chamber head when the power spring is forced to the caged or retracted position by pneumatic pressure acting within the pressure chamber against the spring brake diaphragm. This guidance system ensures that the diaphragm covers all of the vent or bleeder openings, which are typically angularly spaced from each other, usually at ninety degree intervals, about the circumference of the spring chamber head side wall.

A simple but effective guidance system is achieved by forming the spring plate as an annular structure with a central, cavity therein, and by providing the spring plate with a spring plate hub. The spring plate hub is encircled by the coils of the power spring and projects toward the transverse end wall of the spring chamber head. A hub seat is formed at the center of the interior surface of the transverse end wall. The hub seat receives and aids in centering the spring plate hub when the diaphragm compresses the power spring to its caged position.

Preferably also, the spring brake diaphragm has a centering boss projecting therefrom into the spring brake chamber and into the central, axial cavity in the spring plate hub. Thus, when the spring plate hub resides on its seat in a centered, coaxial orientation relative to the transverse end wall, the center of the spring brake diaphragm is held in central, coaxial alignment with the center of the transverse end wall and with the push rod in the service brake portion of the device by the engagement of the centering boss projecting therefrom into the hollow spring plate hub. The guidance system thereby serves not only to ensure axial alignment of the power spring, but also prevents the spring brake diaphragm from becoming misaligned relative to the spring chamber head. Any misalignment of the spring brake diaphragm in caging the power spring would uncover one or more of the bleeder or vent hole openings.

As in conventional, double diaphragm spring brakes, the automotive vehicle spring brake of the present invention includes a caging tool access aperture at the center of the transverse end wall. This aperture is provided in spring brakes to allow a caging tool to be inserted longitudinally into the spring chamber so as to engage the spring plate. The shank of the caging tool is externally threaded and projects from the transverse end wall of the spring chamber head. Once the end of the caging tool that has been inserted into the spring chamber has been twisted so as to engage the spring plate, a steel nut can be advanced longitudinally along the protruding end of the shank of the caging tool to bear against the exterior surface of the transverse end wall of the spring chamber head. Advancement of the nut thereby pulls on the caging tool so as to compress the power spring. Compression of the power spring is a critical safety step that must be taken in initially attaching the spring chamber head to the adapter head and in any attempted disassembly of the pneumatic spring brake for purposes of repair or replacement of component parts.

According to the present invention the caging tool access aperture is provided with a check valve which allows air to be expelled from the spring chamber when the diaphragm further compresses the power spring. The check valve otherwise seals the caging tool access aperture.

When the power spring is retracted by pressure applied within the pressure chamber, the diaphragm covers the vent or bleed openings in the side wall of the spring chamber head shortly before the power spring has been fully compressed to its completely caged position. By providing the transverse end wall with a check valve, a pressure build up in the spring chamber is avoided, since air can escape from the pressure chamber through the check valve as the diaphragm pushes the power spring toward the transverse end wall into its fully compressed, caged position. A build up of pressure would otherwise act against the diaphragm and possibly uncover the breather openings in the spring chamber head side wall. Except when the power spring is moving toward its caged position, the check valve prevents any air or contaminants from entering the spring chamber through the caging tool access opening, since it blocks the flow of air back into the spring chamber through that opening.

When pressure in the pressure chamber is relieved the power spring expands, thereby forcing the diaphragm away from the transverse end wall of the spring chamber head. After only a short longitudinal movement of the diaphragm, the bleed or vent hole openings are uncovered, thus allowing air to be drawn back into the spring chamber, thus equalizing pressure therein with the atmosphere.

The check valve employed in the preferred embodiment of the invention is not a complex structure. Indeed, it may be formed as a simple, resilient stopper having a frustoconical neck projecting into the caging tool access opening so that the frustoconical neck engages the interior surface of the transverse end wall of the spring chamber. The axial center of the neck facing the interior of the spring chamber is preferably dished inwardly and formed into a concave depression, so that the neck forms a lip that extends around the inside surface of the transverse end wall about the perimeter of the caging tool access opening. A pair of diametrically opposed, longitudinally extending vent channels are defined on the outer surface of the frustoconical neck of the stopper. The portion of the check valve located externally from the spring chamber is formed as a radially projecting flange that caps the caging tool access opening.

When the spring brake diaphragm compresses the power spring toward its caged position and covers the bleed or vent openings in the side wall of the spring chamber head, air is expelled through the vent channels in the sides of the stopper neck. The flange of the resilient structure is flexible enough so that it is lifted by the air expelled from the spring chamber and exhausted to the atmosphere. However, when the power spring is extended, thereby forcing the diaphragm away from the transverse end wall of the spring chamber head, the flange of the stopper remains in contact with the outer surface of the transverse end wall surrounding the caging tool access opening therein, thereby blocking the caging tool access opening.

In another broad aspect the invention may be considered to be an improved pneumatic automotive vehicle spring brake comprising: a spring chamber head, an adapter head, a spring brake diaphragm, and a power spring. The spring chamber head is formed with a transverse end wall and a surrounding side wall having at least one vent port therethrough. The side wall of the spring chamber head projects longitudinally from the transverse end wall thereof and terminates at a spring chamber head rim. The adapter head also has a rim which is joined to the rim of the spring chamber head. The peripheral edge of the spring brake diaphragm is entrapped and sealed throughout between the rims of the spring chamber head and the adapter head. The spring brake diaphragm thereby defines a spring chamber with the spring chamber head and a pressure chamber with the adapter head within the enclosure formed by the spring chamber head and the adapter head. The power spring is located within the spring chamber and is compressed between the spring brake diaphragm and the transverse end wall of the spring chamber head. The spring brake diaphragm is responsive to pressure in the pressure chamber to further compress the power spring.

According to the improvement of the invention, as the spring brake diaphragm responds to pressure in the pressure chamber to further compress the power spring, it establishes contact with the side wall of the spring chamber head so as to thereupon seal all vent ports therethrough. As a consequence when the power spring has been forced by the spring brake diaphragm to its fully compressed position retracted against the transverse end wall of the spring chamber head, the structure of the spring brake diaphragm seals the vent ports in the side wall of the spring chamber head.

The invention may be described with greater clarity and particularity with reference to the accompanying drawings.

DESCRIPTION OF THE EMBODIMENT

Figure 1:
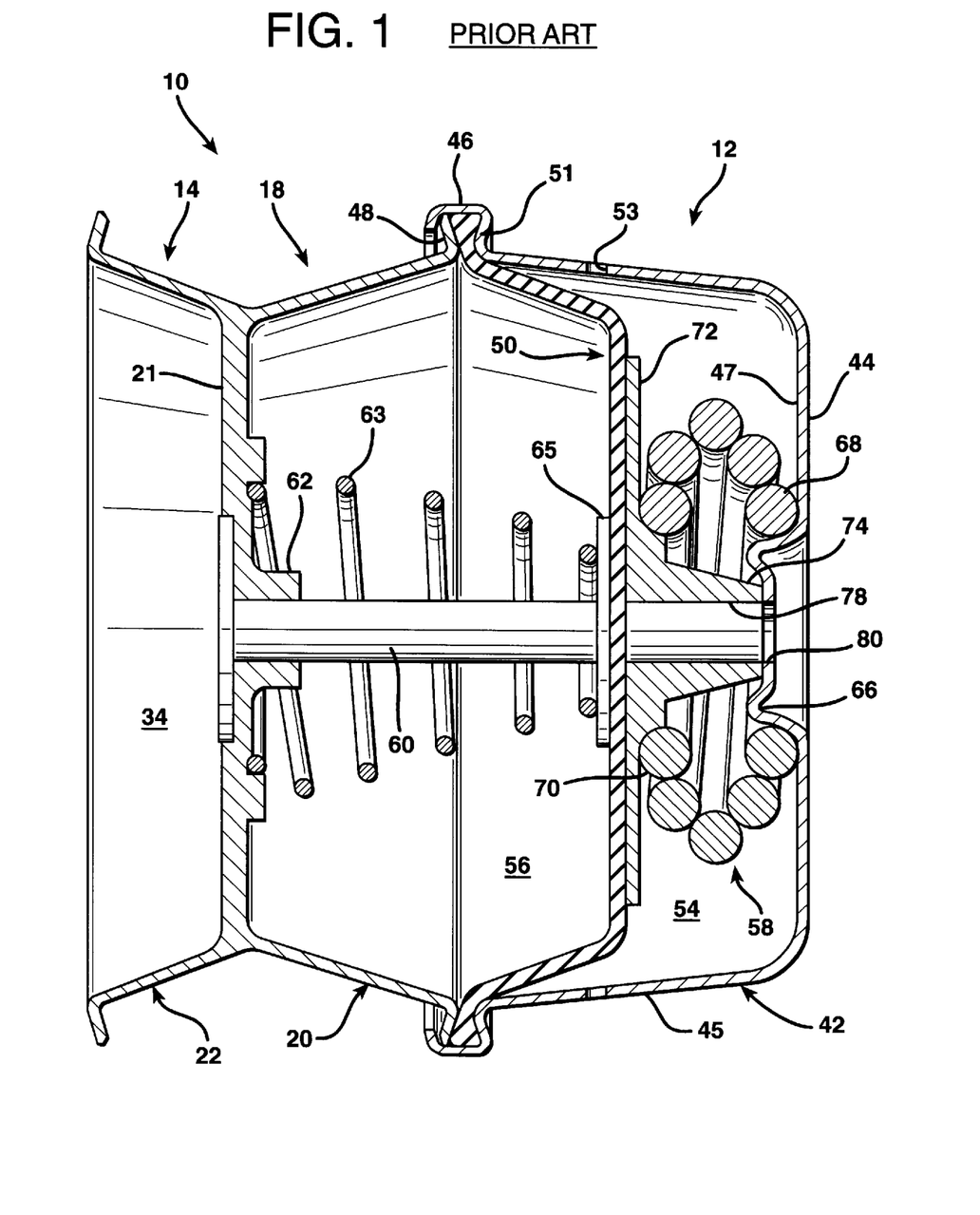
FIG. 1 is a sectional elevational view of a conventional, prior art pneumatic spring brake with the power spring shown in its caged position.

FIG. 1 is a sectional elevational view of the spring brake portion of a conventional, double diaphragm, automotive vehicle brake 10. The service brake portion of the brake 10 is not particularly relevant to the present invention, and the component parts thereof have for the most part been omitted from the drawing figures. The dual diaphragm spring brake 10 is particularly suitable for use with a heavy duty automotive vehicle, such as a truck tractor or trailer. The pneumatic spring brake 10 is fastened in a conventional manner to the vehicle wheel drum and by bolts, nuts, and washers which secure it to the vehicle frame. All of these features are conventional and are not depicted in the drawings.

The conventional pneumatic spring brake 10 includes a service brake portion 14, as well as a conventional spring brake portion as indicated at 12. The service brake portion 14 of the spring brake 10 is of a conventional construction and includes a concave, bowl-shaped or shell-like service brake head (not shown) and an adapter head 18, both formed of steel. The adapter head 18 is formed in two parts and includes a shell-like or bowl-like spring brake adapter head portion 20 and a service brake portion 22, each of which is shaped generally in the form of a frustum of a cone. The service brake chamber portion 22 and the spring brake adapter head portion 20 are coaxially aligned in back-to-back orientation relative to each other and flare outwardly from a common, transverse steel partition 21 that delineates the spring brake portion 12 from the service brake portion 14 of the conventional, pneumatic, automotive vehicle brake 10.

The spring brake portion 12 of the conventional pneumatic spring brake 10 is formed of an enclosing structure that includes the spring brake adapter head portion 20 and a spring chamber head 42. The spring chamber head 42 is a concave, shell-like or bowl-like structure having a transverse, closed end wall 44 and an opposite open end formed by an annular rim 46. The periphery of the transverse end wall 44 is curved toward the adapter head 18. The structure of the spring chamber head 42 extends from the transverse end wall 44 as an annular, generally frustoconical side wall 45 that terminates at its longitudinal extremity in the spring chamber head rim 46. The annular rim 46 of the spring chamber head 42 is secured to the mating, annular rim 48 of the spring brake adapter head 20 in any one of a number of conventional ways. One preferred connection system is described in U.S. Pat. No. 5,560,280, although other systems are also employed for attaching the rims 46 and 48 together.

Regardless of the rim attachment system employed, a reinforced, heavy rubber spring brake diaphragm 50 is disposed within the confines of the spring brake portion 12 of the pneumatic spring brake 10. The rigid, mating rims 46 and 48 of the adapter head 18 and the spring chamber head 42 are disposed in mutual longitudinal alignment and in face-to-face relationship. The rims 46 and 48 compress the periphery 51 of the spring brake diaphragm 50 therebetween. The spring brake diaphragm 50 is of a conventional construction and is formed of layers of rubber which encapsulate fabric mesh within.

Together the spring chamber head 42 and the spring brake adapter head 20 define a cavity therewithin. The spring brake diaphragm 50 is disposed within the cavity to divide it into a spring chamber 54 and a spring brake pressure chamber 56. A heavy, coil power spring 58 is disposed within the spring brake chamber 54. A push rod 60 is disposed within the spring brake pressure chamber 56. The push rod 60 is in coaxial alignment with the power spring 58. The spring brake push rod 60 slides through an annular collar 62, having a central axial opening therethrough, defined in the transverse panel 21 of the spring brake adapter head portion 20, and extends into the pressurized service brake pressure chamber 34. A return spring 63, much lighter and less powerful than the power spring 58, serves to maintain a foot 65 at one end of the push rod 60 in contact with the spring brake diaphragm 50 within the spring brake pressure chamber 56. This ensures that the position of the spring brake diaphragm 50 within the enclosure formed by the adapter head 18 and the spring chamber head 42 always determines the longitudinal position of the push rod 60.

The exterior surface of the transverse end wall 44 of the spring chamber head 42 is formed with a central, axial, generally circular indentation 66 therein. The indentation 66 protrudes axially into the spring chamber 54 coaxially within the end coil 68 of the power spring 58 which bears directly against the interior surface of the transverse end wall 44 of the spring chamber head 42. The axial indentation 66 thereby laterally stabilizes the end coil 68 of the power spring 58 and performs the function of a centering ring. The end coil 68 of the power spring 58 therefore cannot shift laterally relative to the transverse end wall 44 of the spring chamber head 42, but is instead held in axial alignment with the push rod 60.

The opposite end coil 70 of the power spring 58 bears against a shoulder formed in an annular spring plate 72 which has a longitudinally extending hub 74. The spring plate 72 has a radially outwardly projecting flange that resides in bearing relationship against the spring brake diaphragm 50 and a central, axial opening 78 that extends through the hub 74.

The transverse end wall 44 of the spring chamber head 42 also has an aligned, central, axial opening 80 that is normally closed by a metal closure plate (not shown) held in place by a machine screw. The axially aligned openings 78 and 80 allow insertion of a conventional spring "caging" tool which engages the spring plate hub 74 so as to draw the hub 74, and hence the spring plate 72, close to the transverse end wall 44 of the spring chamber head 42, even in the absence of pressure within the spring brake pressure chamber 56. The power spring 58 may thereby be held in the fully compressed condition illustrated in FIG. 1 by the caging tool during the initial assembly of the pneumatic spring brake 10, and during any disassembly of the spring brake portion 12.

The side wall 45 of the spring chamber head 42 is formed with four small breather openings or vent apertures 53 therethrough, located in angular displacement from each other ninety degrees apart. In the conventional, pneumatic, vehicle spring brake 10 the openings 53 are typically about one-quarter of an inch in diameter and are provided to allow condensed moisture to drain from the spring chamber head 42 and to allow air to pass therethrough to prevent any pressure or vacuum build up in the spring chamber 54.

It should be noted that in the conventional, pneumatic spring brake 10 illustrated in FIG. 1, the vent or breather openings 53 are never sealed. Consequently, when the vehicle upon which the pneumatic spring brake 10 is mounted travels along the highway or across other terrain, contaminants and road moisture are frequently splashed onto the spring chamber head 42 and enter the spring chamber 54 through the vent openings 53 in the spring chamber head side wall 45. This moisture can cause the power spring 58 to corrode and ultimately break. Also, solid debris can work its way into the shoulder against which the coil 70 of the power spring 58 rests, and in between the spring plate 72 and the diaphragm 50. As a result, the power spring 58 can become misaligned within the spring chamber 54. When this occurs, damage can result to the diaphragm 50 and also to the power spring 58.

Figure 2:
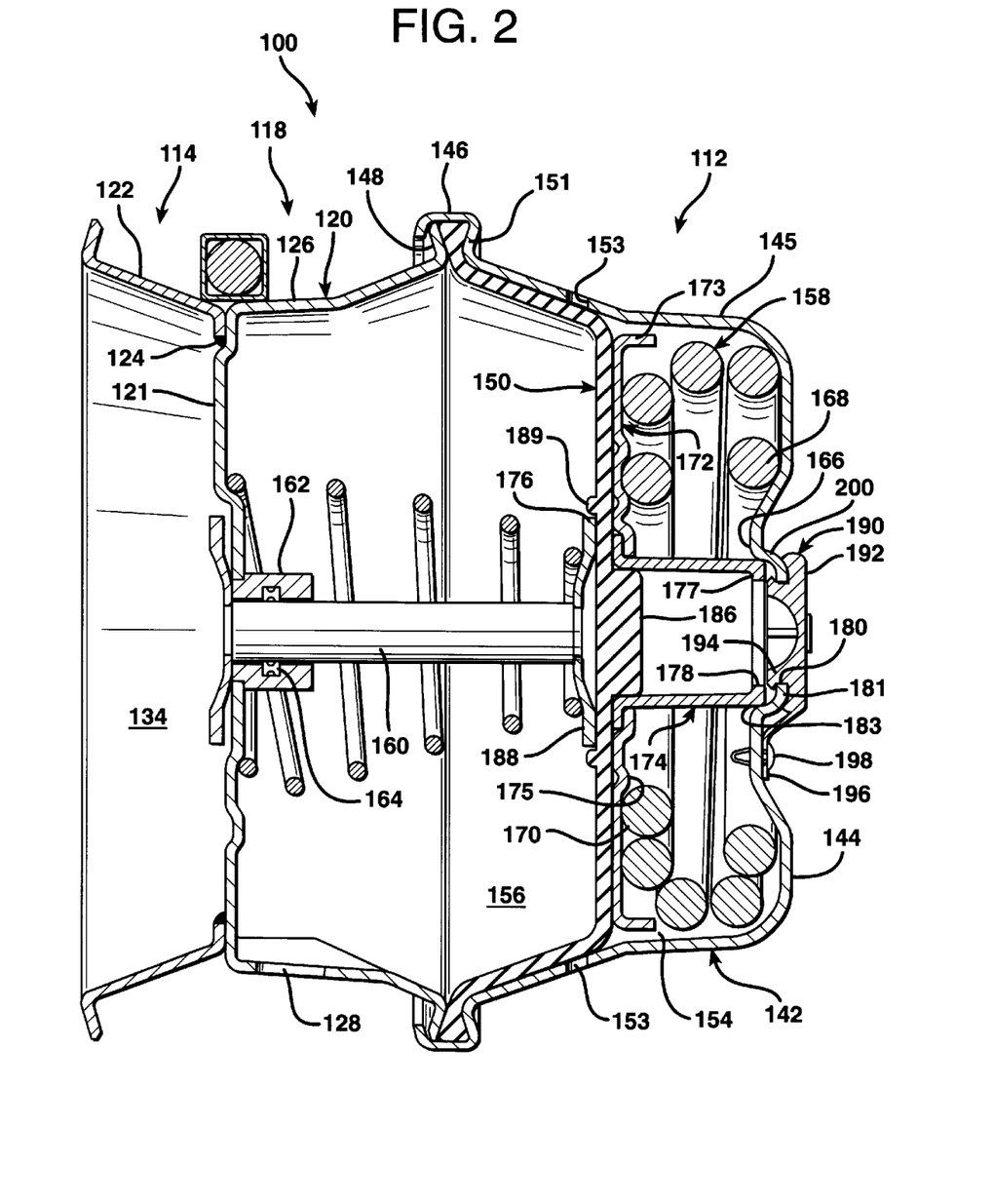
FIG. 2 is a sectional elevational view of a spring brake constructed according to the present invention, likewise shown with the power spring in its fully caged position.
Figure 3:
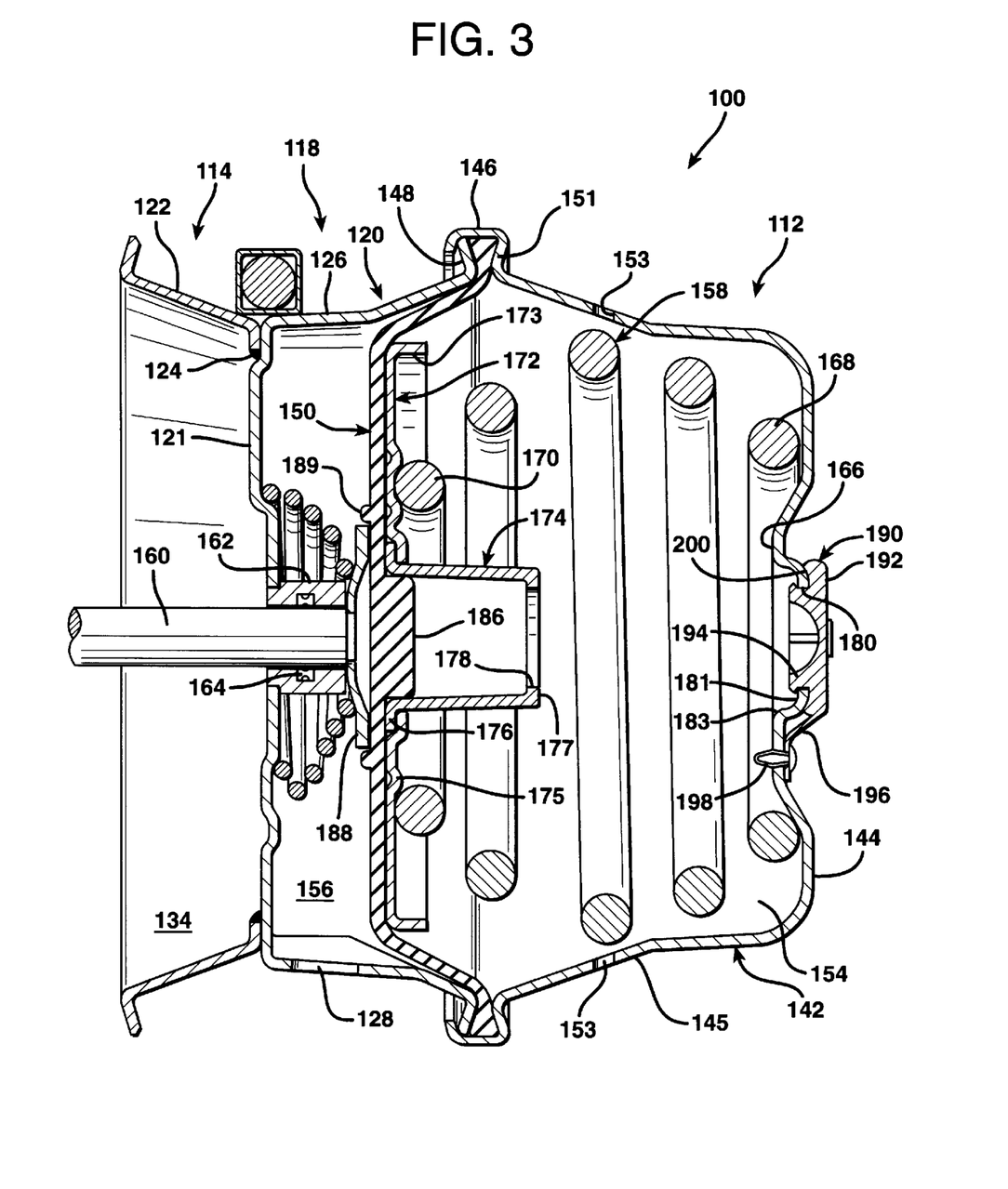
FIG. 3 is a sectional elevational view of the spring brake of the invention shown in FIG. 2 with the power spring shown in its extended position in which it applies the emergency or spring brake.

FIGS. 2 and 3 illustrate a pneumatic automotive vehicle spring brake 100 constructed according to the present invention. The spring brake 100 is similar in a number of respects to the conventional spring brake 10 illustrated in FIG. 1, but is significantly different in certain other critical respects.

The pneumatic spring brake 100 includes both a spring brake portion 112 and a service brake portion 114. The service brake portion 114 is of a conventional construction and includes a shell-like or bowl-like spring brake adapter head portion 120 and a service brake chamber portion 122 welded to the spring brake adapter head portion 120 about its entire circumference by an annular weld 124. The weld 124 secures the radially inwardly directed annular flange of the service brake chamber portion 122 to the transversely extending partition 121 that delineates the service brake portion 114 from the spring brake portion 112 of the pneumatic, vehicle spring brake 100.

The spring brake portion 112 is formed with a concave, bowl-shaped, steel spring chamber head 142 that includes a transversely extending end wall 144 and an annular side wall 145 that extends from the transverse end wall 144 and has a generally frustoconical shape. The side wall 145 extends longitudinally toward the spring brake portion 114 with only a very slight taper for a distance of about three inches, and then flares outwardly at an angle of about eighteen degrees relative to the longitudinal alignment of the spring brake 100. The side wall 145 terminates at a generally circular spring chamber head rim 146. A plurality of vent or breather hole openings 153 are defined in the more sharply flared portion of the spring chamber head side wall 145. The bleeder hole or vent openings 153 are spaced from each other at annularly offset locations, ninety degrees apart, about the circumference of the spring chamber head side wall 145.

The spring chamber portion 120 of the adapter head 118 also has a side wall 126 that extends toward the spring brake portion 112 of the brake 100 with only a slight draft adjacent the partition 121. In this region the side wall 126 includes a pressure inlet opening 128 that is connected to a pneumatic pressure supply through a conventional control valve system. The remaining portion of the side wall 126 flares outwardly at a sharper angle relative to the axis of alignment of the spring brake 100 and terminates in an adapter rim 148 that is secured to the spring chamber head rim 146. As previously indicated, the rims 146 and 148 are preferably secured together in the manner depicted and described in U.S. Pat. No. 5,560,280.

The brake 100 has a transversely extending spring brake diaphragm 150, the peripheral edge 151 of which is clamped and sealed throughout between the rims 146 and 148 of the spring chamber head 142 and the adapter head 118, respectively. The rigid, mating rims 146 and 148 of the spring chamber head 142 and the spring brake adapter head 118, respectively, are coaxially aligned with each other and disposed in a face-to-face relationship. The rims 146 and 148 are joined together throughout the circumference of the spring brake portion 112 of the spring brake 100 and compress the periphery 151 of the spring brake diaphragm 150 therebetween.

The spring brake diaphragm 150 extends transversely across the cavity formed within the confines of the spring chamber head 142 and adapter head 118 to delineate a spring chamber 154 and a spring brake pressure chamber 156. Specifically, the spring brake diaphragm 150 defines the spring chamber 154 as the enclosed space between the spring brake diaphragm 150 and the spring chamber head 142. The spring brake pressure chamber 156 is defined as the space enclosed between the spring brake diaphragm 150 and the adapter head 118.

A push rod 160 is disposed within the spring brake pressure chamber 156 and extends through an axial opening in the transverse partition 121 in the spring adapter head 120. The push rod 160 extends into the pressurized service brake pressure chamber 134. The spring brake push rod 160 slides through an annular bearing 162, located in a central, axial opening defined in the transverse partition 121 of the spring brake adapter head 118. The bearing 162 is constructed of a relatively soft metal, such as bronze, and includes an annular recess in its interior wall in which an O-ring seal 164 is seated.

A strong coil power spring 158 is located within the spring chamber 154 and is compressed between the spring brake diaphragm 150 and the transverse end wall 144 of the spring chamber head 142. The central region 166 of the transverse end wall 144 is indented externally and raised internally so as to form an internal shoulder that laterally stabilizes the end coil 168 of the power spring 158. The end coil 168 is therefore restrained from shifting laterally within the spring chamber head 142, and is instead held in axial alignment with the push rod 160.

The spring brake portion 112 of the spring brake 100 is provided with an annular spring plate 172 which is formed of metal and which is interposed between the power spring 158 and the spring brake diaphragm 150. A circular, central axial opening is defined in the spring plate 172 to receive a longitudinally-extending, frustoconical spring plate hub 174. The outer periphery of the spring plate 172 is formed into a power spring retaining lip 173. A concentric, raised, annular rib 175 is formed in the spring plate 172 radially inwardly from the power spring retaining lip and outwardly from the central opening in the spring plate 172. The annular rib 175 serves to provide a centering shoulder to laterally stabilize the other end coil 170 of the power spring 158.

The spring plate hub 174 has a radially outwardly projecting flange 176 that resides in bearing relationship against the spring plate 172 around the central axial opening therein. At its opposite end the spring plate hub 174 is formed with a radially inwardly turned lip 177 within which a central axial opening 178 is defined.

The transverse end wall 144 of the spring chamber head 142 also has an aligned, central axial opening 180 therein. The opening 180 is formed within the perimeter of a lip 181, which is turned outwardly from a bearing seat shoulder 183 formed on the interior surface of the transverse end wall 144.

The axially aligned openings 178 and 180 allow insertion of a conventional spring "caging" tool which engages the spring plate hub 174 to draw it close to the end wall 144 of the spring chamber head 142 to the position depicted in FIG. 2, even in the absence of pressure within the spring brake pressure chamber 156. The power spring 158 can thereby be mechanically held in the fully compressed condition illustrated in FIG. 2 by the caging tool during the initial assembly of the pneumatic spring brake 100, and during any disassembly of the spring brake portion 112.

The spring brake diaphragm 150 is formed of layers of rubber which encapsulate fabric mesh within. The spring brake diaphragm 150 is formed with a central, axial protrusion or boss 186 that projects into and snugly engages the hollow center of the spring plate hub 174. The boss 186 that protrudes into the chamber 154 laterally stabilizes the end coil 170 of the power spring 158 by preventing the spring plate 172 from shifting laterally across the surface of the spring brake diaphragm 158. The protruding boss 186 acts as a short centering post for the spring plate 172.

The spring brake portion 112 of the pneumatic spring brake 100 is further provided with an annular, disc-shaped, metal push rod seat 188 which is laterally confined within an annular raised ring 189 on the side of the spring brake diaphragm 150 opposite the boss 186. The raised ring 189 serves to maintain the push rod seat 188, and thus the push rod 160, in coaxial alignment with the power spring 158.

An extremely important feature of the invention is the manner in which the spring brake diaphragm 150 conforms to and presses against the surface of the side wall 145 as an elevated pressure within the spring brake pressure chamber 156 forces the central region of the spring brake diaphragm 150 toward the transverse end wall 144, further compressing the power spring 158. A illustrated in FIG. 2, in response to elevated pressure in the pressure chamber 156, the structure of the spring brake diaphragm 150 establishes contact with the interior surface of the side wall 145 throughout its circumference in the region where the vent apertures 153 are formed. The structure of the spring brake diaphragm 150 thereby covers and presses outwardly against all of the vent openings 153. The diaphragm forms a fluid-tight seal against the interior surface of the spring brake housing side wall 145, thereby preventing water, dirt, and other contaminants from entering the spring chamber 154 through the vent openings 153 while the power spring 158 remains in its caged position illustrated in FIG. 2

While the vehicle is traveling on the road and the pneumatic spring brake 100 is operated normally, the power spring 158 will remain caged, as illustrated in FIG. 2. As a consequence, the vent openings 153 are sealed while the vehicle travels, which is when the spring chamber head 142 is exposed to the greatest amount of contaminants. When the vehicle is halted at a destination, the vehicle operator relieves pressure from the pressure chamber 156. Once this occurs, the strong force of the power spring 158 causes the coils of the power spring 158 to extend, thereby forcing the spring brake diaphragm 150 away from the transverse end wall 144 of the spring chamber head 142, in the manner illustrated in FIG. 3. As the structure of the spring brake diaphragm 150 is pushed away from the transverse end wall 144, it progressively loses contact with the side wall 145 of the spring chamber head 142, thus uncovering the vent openings 153. As soon as the diaphragm 150 loses contact with the interior surface of the side wall 145 at the vent openings 153, air can be drawn into the spring chamber 154 through the vent openings 153, thus avoiding the creation of a vacuum within the spring chamber 154. The formation of a vacuum within the spring chamber 154 would interfere with the proper application of the spring brake to the vehicle wheels.

It should be noted that the spring plate hub 174 has a hollow, axial center and projects from the spring plate 172 toward the transverse end wall 144 of the spring chamber head 142. The recess at the center of the interior surface of the transverse end wall 144 formed by the shoulder 183 defines a seat that receives and centers the spring plate hub 174 when the power spring 158 is compressed in its caged position, as illustrated in FIG. 2. The seat formed by the shoulder 183 and the spring plate hub 174 thereby perform the function of a spring plate guide that longitudinally centers the spring plate 174 relative to the axis of alignment of the pneumatic spring brake 100 when the power spring 158 is fully caged, as illustrated in FIG. 2. The axis of alignment may be considered to be defined as the center of the circumference of the spring chamber head rim 146 and the adapter head rim 148.

The boss 186 of the spring brake diaphragm 150, by engaging the central cavity of the hub 174, thereby engages the center of the spring plate 172 to hold it coaxially aligned with the push rod 160. This in turn ensures coaxial alignment of the power spring 158, which in turn ensures that the structure of the power spring diaphragm 150 does not become misaligned to expose any of the vent apertures 153 when the power spring 158 is caged.

A further feature of the invention is the provision of a check valve 190, which is inserted into the central, axial opening 180 in the transverse end wall 144. The check valve 190 is formed as a resilient rubber plug or stopper having a body that forms a radially-projecting cap or flange 192 and a longitudinally-projecting neck 194.

The check valve 190 that is located in the caging tool access opening 180 in the transverse end wall 144 permits air to be expelled from the spring chamber 154 but otherwise forms a hermetic seal in the caging tool access opening 180. A radially-extending fastening tab 196 extends from the cap 192 of the checkvalve 190 and is secured to the transverse end wall 144 by means of a compression fastener 198.

Figure 4:
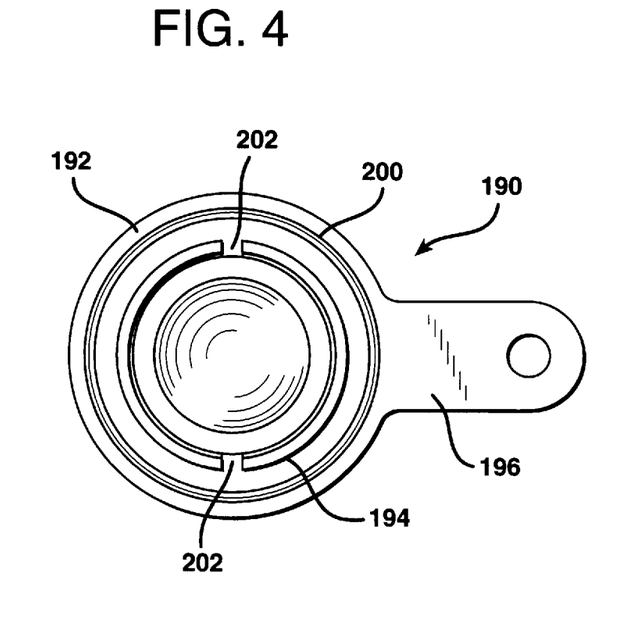
FIG. 4 is a plan detail of the underside of the check valve shown in FIGS. 1 and 2.

The underside of the cap 192 forms a raised, circular, annular sealing ring 200 which normally contacts and forms a fluid-tight seal with the lip 181 surrounding the central axial opening 180 in the transverse end wall 144. The neck 194 of the body of the stopper forming the check valve 190 has an outer surface of generally frustoconical configuration that projects into the caging tool access opening 180. The frustoconical surface of the neck 194 engages the interior surface of the transverse end wall 144 of the spring chamber 154. As best illustrated in FIG. 4, a pair of diametrically opposed, longitudinally extending vent channels 202 are defined in the outer surface of the frustoconical neck 194 of the check valve stopper.

When elevated pressure within the pressure chamber 156 forces the spring brake diaphragm 150 toward the transverse end wall 144, the structure of the spring brake diaphragm 150 seals the vent openings 153 as the spring brake diaphragm 150 approaches the position in which it completely cages the power spring 158. However, for the short, additional, longitudinal distance that the central region of the spring brake diaphragm 150 travels once having sealed the vent openings 153, the vent channels 202 provide a means for allowing air to escape from the spring chamber 154, thus preventing the build up of pressure therein. The air expelled during this last stage of caging the power spring 158 travels through the vent channels 202 and lifts the sealing ring 200 slightly from the lip 181 to allow air to escape from the spring chamber 154. Thereafter, the ambient atmospheric pressure and the resiliency of the unitary rubber stopper forming the check valve 190 return the sealing ring 200 to its sealing position of contact with the lip 181 of the transverse wall 144.

When pressure within the pressure chamber 156 is relieved, the power spring 158 pushes the spring brake diaphragm 150 away from the transverse end wall 144 of the spring chamber head 142. The sealing ring 200 maintains the integrity of the fluid-tight seal at the caging tool access opening 180 in the transverse end wall 144. However, as soon as the spring brake diaphragm 150 is drawn out of contact with the interior surface of the side wall 145 at the location of the vent ports 153, air is thereafter drawn into the spring chamber 154 as the spring brake diaphragm 150 continues in its movement away from the transverse end wall 144 to the spring brake engaging position illustrated in FIG. 3.

Undoubtedly, numerous variations and modifications of the invention will become readily apparent to those familiar with automotive vehicle spring brakes. For example, other types of guide mechanisms may be employed to guard against misalignment of the power spring, the spring plate, or the spring brake diaphragm within the spring brake portion 112 of the spring brake 100. Accordingly, the scope of the invention should not be construed as limited to this specific embodiment illustrated and described.

I claim:

1. A pneumatic automotive vehicle spring brake having a longitudinal alignment comprising:

a spring chamber head having a transverse end wall and a surrounding side wall that extends longitudinally from said transverse end wall and which includes a flared portion that flares outwardly at an angle of about eighteen degrees relative to said longitudinal alignment of said spring brake, and said flared portion has at least one vent opening therethrough, an adapter head joined to said spring chamber head to form a hollow enclosure therebetween and said transverse end wall of said spring chamber head is located remote from said adapter head, a spring brake diaphragm having a periphery clamped between said spring brake head and said adapter head so that said diaphragm divides said hollow enclosure into a spring chamber and a pressure chamber and said diaphragm is longitudinally deflectable between a position closest to said transverse end wall of said spring chamber head and a position furthest from said transverse end wall, and a power spring compressed within said spring chamber so as to bear against said transverse end wall and said diaphragm, and wherein said diaphragm is deflectable by pressure applied within said pressure chamber so as to further compress said power spring and concurrently contact said surrounding side wall of said spring chamber head to thereby seal said at least one vent opening therethrough, only as said diaphragm approaches said position closest to said transverse end wall of said spring chamber head, and wherein said diaphragm is deflectable by said power spring when pressure in said pressure chamber is relieved to thereby unseal said at least one vent opening as soon as said diaphragm is deflected from said position closest to said transverse end wall.

2. A pneumatic spring brake according to claim 1 wherein said power spring is a coil spring and further comprising a transverse spring plate located within said spring chamber and interposed between said diaphragm and said power spring, and said spring plate is provided with a spring plate hub that projects toward said transverse end wall within said power spring, and said transverse end wall defines a hub seat at its center that receives and aids in centering said spring plate hub when said diaphragm further compresses said power spring.

3. A pneumatic spring brake according to claim 1 wherein said side wall of said spring chamber head includes a plurality of vent openings therethrough angularly spaced from each other, and said spring plate is an annular structure and said spring plate hub has a central, axial cavity therein facing said spring brake diaphragm, and said spring brake diaphragm has a centering boss projecting therefrom into said spring brake chamber and into said central, axial cavity in said spring plate hub.

4. A pneumatic spring brake according to claim 1 further comprising a caging tool access aperture at the center of said transverse end wall, and a check valve located in said caging tool access aperture which allows air to be expelled from said spring chamber when said diaphragm further compresses said power spring and which otherwise seals said caging tool access aperture.

5. A pneumatic spring brake according to claim 4 wherein said check valve is formed as a resilient, unitary structure comprised of a cap portion disposed in contact with said transverse end wall on the exterior surface thereof, and a plug portion that extends inwardly toward said spring chamber from said cap portion and fits snugly into said caging tool access aperture, and said plug portion includes at least one longitudinally-extending vent channel defined thereon.

6. A pneumatic spring brake according to claim 5 wherein said plug portion of said check valve includes a pair of diametrically opposed vent channels as aforesaid.

7. A pneumatic spring brake for an automotive vehicle comprising:

a housing having a longitudinal alignment and formed of a spring chamber head and an adapter head, wherein said spring chamber head has a transverse end and a side wall that surrounds and extends longitudinally from said transverse end and which includes a flared portion that flares outwardly from said longitudinal alignment at an angle of about eighteen degrees relative thereto and which terminates at an annular spring chamber rim and at least one bleed opening is defined through said flared portion of said spring chamber head, and said adapter head has an annular adapter head rim which is engaged in mating fashion to said annular spring chamber rim, a spring brake diaphragm having a periphery compressed between said annular rims of said spring brake head and said adapter head, a power spring compressed between said transverse end of said spring chamber head and said spring brake diaphragm, and a spring plate interposed between said spring brake diaphragm and said power spring, whereby said power spring urges said spring plate and said diaphragm toward said adapter head and said power spring is compressible into a caged position within said spring chamber head by pneumatic pressure applied within said adapter head against said spring brake diaphragm on the side thereof opposite said spring plate, and so that said spring brake diaphragm covers and seals said at least one bleed opening only as said power spring is compressed and approaches its caged position, and said at least one bleed opening is unsealed as said power spring leaves said caged position.

8. A pneumatic spring brake according to claim 7 wherein said surrounding side wall of said spring chamber head is formed with at least four bleed openings as aforesaid, angularly spaced from each other about the circumference of said side wall, and said spring brake diaphragm covers and seals all of said bleed openings when said power spring is compressed in its caged position.

9. A pneumatic spring brake according to claim 8 further comprising a spring plate guide that ensures that said spring plate resides in centered longitudinal alignment relative to said transverse end of said spring chamber head when said power spring is compressed in its caged position.

10. A pneumatic spring brake according to claim 9 wherein said spring plate has an annular configuration, and said spring plate guide is comprised of a spring plate hub that has a hollow center and projects from said spring plate toward said transverse end of said spring chamber head, and said transverse end of said spring chamber head has an inner surface that defines a seat to receive and center said spring plate hub when said power spring is compressed in its caged position.

11. A pneumatic spring brake according to claim 10 wherein said spring brake diaphragm has a boss that projects into and snugly engages said center of said spring plate hub.

12. A pneumatic spring brake according to claim 10 wherein said transverse end of said spring chamber head has a caging tool access opening defined therethrough and further comprising a check valve located in said caging tool access opening, and said check valve permits expulsion of air from said spring chamber head and blocks the passage of air into said spring chamber head through said caging tool access opening.

13. A pneumatic spring brake according to claim 12 wherein said check valve is comprised of a resilient stopper having a frustoconical neck projecting into said caging tool access opening so that said frustoconical neck engages the inner surface of said transverse end of said spring chamber, and a pair of diametrically opposed vent channels are defined on the outer surface of said frustoconical neck of said stopper.

14. A longitudinally aligned pneumatic automotive vehicle spring brake comprising:
 a spring chamber head formed with a transverse end wall and a surrounding side wall that extends longitudinally from said transverse end wall and which includes a flared portion that flares outwardly at an angle of about eighteen degrees relative to said longitudinal alignment of said spring brake, and said flared portion has at least one vent port therethrough and terminates at a spring chamber head rim,
 an adapter head having a rim joined to said rim of said spring chamber head,
 a transversely extending spring brake diaphragm having a peripheral edge entrapped and sealed throughout between said rims of said spring chamber head and said adapter head to define a spring chamber with said spring chamber head and a pressure chamber with said adapter head,
 a power spring located within said spring chamber and compressed between said spring brake diaphragm and said transverse end wall of said spring chamber head, and wherein said spring brake diaphragm is responsive to pressure in said pressure chamber to further compress said power spring and to establish contact with said side wall of said spring chamber head so as to thereupon seal said at least one vent port therethrough, only as said diaphragm approaches a position closest to said transverse end wall of said spring chamber head, and wherein said diaphragm is deflectable by said power spring when pressure in said pressure chamber is relieved to thereby unseal said at least one vent port as soon as said diaphragm is deflected from said position closest to said transverse end wall.

15. A pneumatic automotive vehicle spring brake according to claim 14 further comprising a plurality of vent ports as aforesaid angularly spaced from each other about the circumference of said side wall, a spring plate located within said spring chamber and interposed between said power spring and said spring brake diaphragm, and a guide for longitudinally centering said spring plate relative to the circumference of said spring chamber head and adapter head rims when said spring brake diaphragm further compresses said power spring.

16. A pneumatic automotive vehicle spring brake according to claim 15 wherein said spring plate has an annular shape and said spring brake diaphragm has a boss projecting into said spring chamber to engage the center of said spring plate.

17. A pneumatic automotive vehicle spring brake according to claim 14 wherein said transverse end wall has a caging tool access opening defined therethrough, and further comprising a check valve located in said caging tool access opening which permits air to be expelled from said spring chamber and which otherwise forms a hermetic seal in said caging tool access opening.

* * * * *